(12) United States Patent
Iwata et al.

(10) Patent No.: US 11,594,786 B2
(45) Date of Patent: Feb. 28, 2023

(54) NONAQUEOUS ELECTROLYTE SECONDARY BATTERY LAMINATED SEPARATOR

(71) Applicant: Sumitomo Chemical Company, Limited, Tokyo (JP)

(72) Inventors: Shizuka Iwata, Saka (JP); Kosuke Kurakane, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 323 days.

(21) Appl. No.: 16/848,908

(22) Filed: Apr. 15, 2020

(65) Prior Publication Data

US 2020/0335760 A1    Oct. 22, 2020

(30) Foreign Application Priority Data

Apr. 16, 2019  (JP) .............................. JP2019-078112

(51) Int. Cl.
| | |
|---|---|
| *H01M 50/449* | (2021.01) |
| *H01M 50/411* | (2021.01) |
| *H01M 50/446* | (2021.01) |
| *H01M 50/414* | (2021.01) |
| *H01M 50/417* | (2021.01) |
| *H01M 50/423* | (2021.01) |
| *H01M 50/489* | (2021.01) |
| *H01M 50/451* | (2021.01) |

(52) U.S. Cl.
CPC ....... *H01M 50/446* (2021.01); *H01M 50/414* (2021.01); *H01M 50/417* (2021.01); *H01M 50/423* (2021.01); *H01M 50/449* (2021.01); *H01M 50/451* (2021.01); *H01M 50/489* (2021.01)

(58) Field of Classification Search
None
See application file for complete search history.

(56) References Cited

U.S. PATENT DOCUMENTS

| | | | |
|---|---|---|---|
| 2006/0141341 A1* | 6/2006 | Nishino | H01M 4/505 429/231 |
| 2006/0234031 A1* | 10/2006 | Takata | B29C 55/005 264/479 |
| 2007/0264577 A1 | 11/2007 | Katayama et al. | |
| 2009/0067119 A1 | 3/2009 | Katayama et al. | |
| 2010/0227210 A1 | 9/2010 | Fukunaga et al. | |
| 2014/0113176 A1* | 4/2014 | Muramatsu | H01M 50/431 429/144 |
| 2014/0178741 A1 | 6/2014 | Hasegawa et al. | |
| 2017/0279102 A1 | 9/2017 | Hasegawa et al. | |
| 2018/0083249 A1 | 3/2018 | Hasegawa et al. | |
| 2022/0052420 A1* | 2/2022 | Tsukagoshi | H01M 50/463 |

FOREIGN PATENT DOCUMENTS

| | | |
|---|---|---|
| CN | 103718338 A | 4/2014 |
| JP | 2008123996 A | 5/2008 |
| JP | 2017-035867 A | 2/2017 |
| WO | 2009/147833 A1 | 12/2009 |
| WO | WO 2020/066108  * | 4/2020 |

OTHER PUBLICATIONS

Office Action dated Nov. 1, 2022 in JP Application No. 2019-078112 (Partial English translation).
Office Action dated Dec. 15, 2022 in Chinese Application 202010300672.X.

* cited by examiner

*Primary Examiner* — Anca Eoff
(74) *Attorney, Agent, or Firm* — Panitch Schwarze Belisario & Nadel LLP

(57) ABSTRACT

An aspect of the present invention achieves a nonaqueous electrolyte secondary battery laminated separator which has excellent heat resistance and exhibits an excellent initial battery characteristic when used in a nonaqueous electrolyte secondary battery. A nonaqueous electrolyte secondary battery laminated separator in accordance with an aspect of the present invention includes: a polyolefin porous film; and a porous layer which (i) is disposed on at least one surface of the polyolefin porous film and (ii) includes a heat resistant filler, the porous layer having a surface which has cracks, a ratio of a total area of the cracks to a surface area of the porous layer being 0.15% to 10%.

9 Claims, 2 Drawing Sheets

NONAQUEOUS ELECTROLYTE SECONDARY BATTERY LAMINATED SEPARATOR

This Nonprovisional application claims priority under 35 U.S.C. § 119 on Patent Application No. 2019-078112 filed in Japan on Apr. 16, 2019, the entire contents of which are hereby incorporated by reference.

TECHNICAL FIELD

The present invention relates to a laminated separator for a nonaqueous electrolyte secondary battery (hereinafter referred to as a "nonaqueous electrolyte secondary battery laminated separator").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

For example, in known art such as that of Patent Literature 1, there are nonaqueous electrolyte secondary batteries including a porous insulating layer. In the nonaqueous electrolyte secondary battery disclosed in Patent Literature 1, a crack is formed in a porous insulating layer at a folded portion of an electrode group, in order to improve impregnation of a nonaqueous electrolyte.

CITATION LIST

Patent Literature

[Patent Literature 1]
International Publication No. WO 2009/147833

SUMMARY OF INVENTION

Technical Problem

However, prior art such as that described above has room for improvement in terms of heat resistance and an initial battery characteristic. An object of an aspect of the present invention is to achieve a nonaqueous electrolyte secondary battery laminated separator which has excellent heat resistance and exhibits an excellent initial battery characteristic when used in a nonaqueous electrolyte secondary battery.

Solution to Problem

In order to solve the above problem, as a result of diligent research, the inventor of the present invention arrived at the present invention after discovering that it is possible to improve heat resistance and an initial battery characteristic by controlling the ratio of the area of cracks in a porous layer of a nonaqueous electrolyte secondary battery laminated separator so that the ratio falls within a predetermined range. The present invention includes the following aspects.

<1> A nonaqueous electrolyte secondary battery laminated separator including: a polyolefin porous film; and a porous layer which (i) is disposed on at least one surface of the polyolefin porous film and (ii) includes a heat resistant filler, the porous layer having a surface which has cracks, a ratio of a total area of the cracks to a surface area of the porous layer being 0.15% to 10%.

<2> The nonaqueous electrolyte secondary battery laminated separator according to <1>, wherein the heat resistant filler includes at least one selected from the group consisting of an organic filler and an inorganic filler.

<3> The nonaqueous electrolyte secondary battery laminated separator according to <2>, wherein the organic filler includes a thermoplastic resin having heat resistance or a thermosetting resin.

<4> The nonaqueous electrolyte secondary battery laminated separator according to <2>, wherein the inorganic filler includes at least one compound selected from the group consisting of alumina, boehmite, aluminum hydroxide, magnesium hydroxide, magnesium oxide, titanium oxide, and silica.

<5> The nonaqueous electrolyte secondary battery laminated separator according to any one of <1> to <4>, wherein the porous layer contains at least one binder resin selected from the group consisting of a polyolefin, a (meth)acrylate resin, a fluorine-containing resin, a polyamide resin, a polyester resin, and a water-soluble polymer.

<6> The nonaqueous electrolyte secondary battery laminated separator according to <5>, wherein the polyamide resin is an aramid resin.

<7> The nonaqueous electrolyte secondary battery laminated separator according to any one of <1> to <6>, wherein within a 230 μm×170 μm area of the surface of the porous layer, a total length of the cracks is 40.0 μm to 2000.0 μm.

<8> A nonaqueous electrolyte secondary battery member including: a positive electrode; the nonaqueous electrolyte secondary battery laminated separator according to any one of <1> to <7>; and a negative electrode, the positive electrode, the nonaqueous electrolyte secondary battery laminated separator, and the negative electrode being arranged in this order.

<9> A nonaqueous electrolyte secondary battery including: the nonaqueous electrolyte secondary battery laminated separator according to any one of <1> to <7>.

Advantageous Effects of Invention

An aspect of the present invention makes it possible to provide a nonaqueous electrolyte secondary battery laminated separator which has excellent heat resistance and exhibits an excellent initial battery characteristic when used in a nonaqueous electrolyte secondary battery.

DESCRIPTION OF EMBODIMENTS

Figure 1:
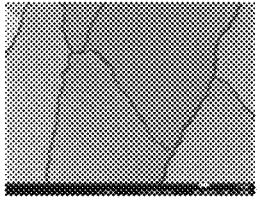
FIG. 1 consists of SEM images and binarized images of the surfaces of porous layers included in the nonaqueous electrolyte secondary battery laminated separators of Examples 1 to 5.

The following description will discuss embodiments of the present invention. Note, however, that the present invention is not limited to the embodiment. The present invention is not limited to arrangements described below, but may be altered in various ways by a skilled person within the scope of the claims. The present invention also encompasses, in its technical scope, any embodiment derived by combining technical means disclosed in differing embodiments.

Any numerical range expressed as "A to B" herein means "not less than A and not more than B" unless otherwise stated.

[1. Nonaqueous Electrolyte Secondary Battery Laminated Separator]

A nonaqueous electrolyte secondary battery laminated separator in accordance with an embodiment of the present invention includes: a polyolefin porous film; and a porous layer which (i) is disposed on at least one surface of the polyolefin porous film and (ii) includes a heat resistant filler, the porous layer having a surface which has cracks, a ratio of a total area of the cracks to a surface area of the porous layer being 0.15% to 10%. Hereinafter, a nonaqueous electrolyte secondary battery laminated separator may also be referred to simply as a "laminated separator".

In conventional technical common knowledge, it was thought that it was preferable to have as few cracks as possible in the surface of a porous layer. However, the inventor of the present invention discovered that a laminated separator whose porous layer has cracks to a suitable degree has excellent heat resistance and exhibits an excellent initial battery characteristic when used in a nonaqueous electrolyte secondary battery.

<Polyolefin Porous Film>

The polyolefin porous film may serve as a base material of a laminated separator including the porous layer (described later). Hereinafter, a polyolefin porous film may be referred to simply as a "porous film". The porous film contains a polyolefin-based resin as a main component and has therein many pores connected to one another, so that gas and liquid can pass through the porous film from one surface to the other.

The porous film contains polyolefin at a proportion of not less than 50% by volume, preferably not less than 90% by volume, and more preferably not less than 95% by volume, relative to the entire porous film. The polyolefin more preferably contains a high molecular weight component having a weight-average molecular weight of $5\times10^5$ to $15\times10^6$. In particular, the polyolefin more preferably contains a high molecular weight component having a weight-average molecular weight of not less than 1,000,000 because such a high molecular weight component improves the strength of a resultant nonaqueous electrolyte secondary battery separator.

Examples of the polyolefin (thermoplastic resin) encompass a homopolymer or a copolymer each produced by polymerizing a monomer such as ethylene, propylene, 1-butene, 4-methyl-1-pentene, and 1-hexene. Examples of the homopolymer encompass polyethylene, polypropylene, and polybutene. Examples of the copolymer encompass an ethylene-propylene copolymer.

Among the above examples, polyethylene is more preferable as it is capable of preventing a flow of an excessively large electric current at a lower temperature. This preventing of an excessively large electric current is also referred to as shutdown. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable.

The porous film has a thickness of preferably 4 μm to 40 μm, more preferably 5 μm to 30 μm, and even more preferably 6 μm to 15 μm.

A weight per unit area of the porous film can be set as appropriate in view of strength, thickness, weight, and handleability. Note, however, that the weight per unit area of the porous film is preferably 4 $g/m^2$ to 20 $g/m^2$, more preferably 4 $g/m^2$ to 12 $g/m^2$, and even more preferably 5 $g/m^2$ to 10 $g/m^2$, so as to allow the nonaqueous electrolyte secondary battery to have a higher weight energy density and a higher volume energy density.

The porous film has an air permeability of preferably 30 s/100 mL to 500 s/100 mL, and more preferably 50 s/100 mL to 300 s/100 mL, in terms of Gurley values. A porous film having the above air permeability can achieve sufficient ion permeability.

The porous film has a porosity of preferably 20% by volume to 80% by volume, and more preferably 30% by volume to 75% by volume, so as to (i) retain an electrolyte in a larger amount and (ii) obtain a function of reliably preventing a flow of an excessively large electric current at a lower temperature. Further, in order to achieve sufficient ion permeability and prevent particles from entering the positive electrode and/or the negative electrode, the porous film has pores each having a pore size of preferably not more than 0.3 μm, and more preferably not more than 0.14 μm.

<Porous Layer>

The porous layer can be provided on one surface of the porous film or on both surfaces of the porous film. The porous layer, as a member included in a nonaqueous electrolyte secondary battery, can be provided between (i) the porous film and (ii) at least one of a positive electrode and a negative electrode. Alternatively, the porous layer can be provided between (i) the porous film and (ii) at least one of the positive electrode and the negative electrode, in a manner so as to be in contact with the porous film and the at least one of the positive electrode and the negative electrode. The number of porous layer(s) provided between (i) the porous film and (ii) at least one of the positive electrode and the negative electrode can be one, two, or more. The porous layer is preferably an insulating porous layer.

In a case where the porous layer is disposed on one surface of the porous film, the porous layer is preferably disposed on a surface of the porous film which surface faces the positive electrode. The porous layer is more preferably disposed on a surface which makes contact with the positive electrode.

The porous layer in accordance with an embodiment of the present invention includes a heat resistant filler. Herein, the term "heat resistant filler" refers to a filler that does not melt or thermally decompose at temperatures at which the porous film melts (for example, at approximately 130° C. in a case where the porous film is made of polyethylene). Examples of the heat resistant filler encompass inorganic fillers and organic fillers. It is possible to use only one heat resistant filler, or two or more heat resistant fillers in combination.

Examples of materials for the inorganic filler encompass talc, clay, kaolin, silica, hydrotalcite, diatomaceous earth, magnesium carbonate, barium carbonate, magnesium sulfate, barium sulfate, aluminum hydroxide, magnesium hydroxide, magnesium oxide, titanium oxide, alumina, boehmite, mica, zeolite, glass, calcium carbonate, calcium sulfate, and calcium oxide. The inorganic filler preferably includes at least one compound selected from the group consisting of alumina, boehmite, aluminum hydroxide, magnesium hydroxide, magnesium oxide, titanium oxide, and silica.

The organic filler preferably includes a thermoplastic resin having heat resistance or a thermosetting resin. Herein, "a thermoplastic resin having heat resistance" refers to a thermoplastic resin whose melting point or glass transition temperature Tg is not lower than 150° C.

Examples of the thermosetting resin encompass: benzenediol-aldehyde resin; a fluorine-containing resin such as polytetrafluoroethylene, a tetrafluoroethylene-hexafluoropropylene copolymer, a vinylidene fluoride-tetrafluoroethylene copolymer, polyvinylidene fluoride, and a vinylidene fluoride-hexafluoropropylene copolymer; melamine resin; and urea resin.

The benzenediol-aldehyde resin is a polymer produced through polymerization of (i) a monomer having a benzenediol skeleton and (ii) an aldehyde monomer. Examples of the monomer having a benzenediol skeleton encompass catechol, resorcin (resorcinol), and hydroquinone. Resorcin is preferable. Examples of the aldehyde monomer encompass formaldehyde, acetaldehyde, propionaldehyde, benzaldehyde, furfural, and thiophene carboxaldehyde. Formaldehyde is preferable.

Examples of the thermoplastic resin having heat resistance encompass engineering plastic and super engineering plastic. Examples of the engineering plastic encompass polyamides (PA), polycarbonates (PC), polyacetal (POM), modified polyphenylene ether (m-PPE), and polybutylene terephthalate (PBT). Examples of the super engineering plastic encompass polyphenyl sulfide (PPS), polyarylates (PAR), polysulfones (PSU), polyether ether ketone (PEEK), polyether imide (PEI), liquid crystal polymers (LCP), and polyimides (PI).

An average particle diameter (D50) of the heat resistant filler in the porous layer is preferably not less than 0.001 µm, more preferably not less than 0.01 µm, and even more preferably not less than 0.05 µm. The average particle diameter (D50) is preferably not more than 10 µm, more preferably not more than 8 µm, and even more preferably not more than 5 µm.

The surface of the porous layer has cracks. A ratio of the total area of the cracks to the surface area of the porous layer is 0.15% to 10%. Herein, the term "crack" refers to a groove having a width of 0.5 µm to 5 µm and a total length of not less than 10 µm, as observed in a scanning electron microscope image of the porous layer. The ratio of the total area of the cracks to the surface area of the porous layer may be simply referred to as a "crack area ratio".

In a case where the crack area ratio is not less than 0.15%, strain occurring in the porous layer under high temperatures is lessened due to the presence of cracks. This makes it possible to favorably maintain the shape of the laminated separator even when the laminated separator is heated. Furthermore, the presence of cracks improves the permeability of the electrolyte and ions through the laminated separator, and thus improves an initial battery characteristic. In a case where the crack area ratio is not more than 10%, it is possible to achieve excellent heat resistance and an excellent initial battery characteristic without impairing e.g. the mechanical strength of the laminated separator and the safety of the nonaqueous electrolyte secondary battery. The crack area ratio is preferably 0.15% to 9.5%, more preferably 0.2% to 8.0%, and even more preferably 0.3% to 5.0%.

A total length of cracks within a 230 µm×170 µm area of the surface of the porous layer is preferably 40.0 µm to 2000.0 µm, more preferably 100.0 µm to 1800.0 µm, and even more preferably 200.0 µm to 1600.0 µm. In a case where the total length of cracks is not less than 40.0 µm, it is possible to favorably maintain the shape of the laminated separator even when heated, and it is also possible to improve an initial battery characteristic, as described above. In a case where the total length of cracks is not more than 2000.0 µm, it is possible to prevent a decrease in mechanical strength of the laminated separator and a decrease in the safety of the nonaqueous electrolyte secondary battery.

Note that the crack area ratio and the total length of cracks are each the average value of 5 measurements. Specific methods for measuring the crack area ratio and the total length of cracks are described later, in the discussion of the Examples.

The porous layer preferably includes a binder resin. It is preferable that the binder resin used in the porous layer be insoluble in the electrolyte of the battery and be electrochemically stable when the battery is in normal use.

Examples of the binder resin encompass polyolefins; (meth)acrylate resins; fluorine-containing resins; polyamide resins; polyimide resins; polyester resins; rubbers; resins with a melting point or glass transition temperature of not lower than 180° C.; water-soluble polymers; polycarbonate; polyacetal; and polyether ether ketone.

Among the above binder resins, polyolefins, (meth)acrylate resins, fluorine-containing resins, polyamide resins, polyester resins, and water-soluble polymers are preferable.

Preferable examples of the polyolefins encompass polyethylene, polypropylene, polybutene, and an ethylene-propylene copolymer.

Examples of the fluorine-containing resins encompass polyvinylidene fluoride (PVDF), polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene-tetrafluoroethylene copolymer, and an ethylene/tetrafluoroethylene copolymer, and particularly fluorine-containing rubber having a glass transition temperature of not higher than 23° C.

As the polyamide resins, aramid resins such as aromatic polyamides and wholly aromatic polyamides are preferable.

Specific examples of the aramid resins encompass poly (paraphenylene terephthalamide), poly(metaphenylene terephthalamide), poly(metaphenylene isophthalamide), poly (parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly (paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/metaphenylene terephthalamide copolymer, a paraphenylene terephthalamide/2,6-dichloroparaphenylene terephthalamide copolymer, and a metaphenylene terephthalamide/2,6-dichloroparaphenylene terephthalamide copolymer. Among these, poly(paraphenylene terephthalamide), poly(metaphenylene terephthalamide), and the paraphenylene terepthalamide/metaphenylene terephthalamide copolymer are preferable.

The polyester resins are preferably aromatic polyesters such as polyarylates, or liquid crystal polyesters.

Examples of the rubbers encompass a styrene/butadiene copolymer and a hydride thereof, a methacrylic acid ester copolymer, an acrylonitrile/acrylic acid ester copolymer, a styrene/acrylic acid ester copolymer, an ethylene propylene rubber, and polyvinyl acetate.

Examples of the resins having a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymers encompass polyvinyl alcohol, polyethylene glycol, cellulose ether, sodium alginate, polyacrylic acid, polyacrylamide, and polymethacrylic acid.

Specific examples of the cellulose ether encompass carboxymethyl cellulose (CMC), hydroxyethyl cellulose (HEC), carboxyethyl cellulose, methyl cellulose, ethyl cellulose, cyanoethyl cellulose, and oxyethyl cellulose. Among these examples, CMC or HEC are more preferable because CMC and HEC degrade less in long term usage and have excellent chemical stability. CMC is particularly preferable.

The porous layer may contain only one of the above resins or two or more of the above resins in combination.

The amount of filler contained in the porous layer, with respect to the total amount of the resin and the filler, is preferably not less than 40 weight % and not more than 99.5 weight %, more preferably not less than 50 weight % and not more than 99.0 weight %, and even more preferably not less than 60 weight % and not more than 98.5 weight %.

The porous layer is preferably provided between the polyolefin porous film and a positive electrode active material layer of the positive electrode. The descriptions below of the physical properties of the porous layer describe at least the physical properties of a porous layer disposed between the polyolefin porous film and the positive electrode active material layer of the positive electrode in a nonaqueous electrolyte secondary battery.

The porous layer has a thickness (per one porous layer) of preferably 0.5 µm to 10 µm, and more preferably 1 µm to 8 µm, in terms of achieving battery safety and a high energy density. The porous layer having a thickness of not less than 0.5 µm (per one porous layer) makes it possible to sufficiently prevent an internal short circuit caused by e.g. damage to the nonaqueous electrolyte secondary battery, and also to retain a sufficient amount of the electrolyte in the porous layer. Setting the thickness of the porous layer to be not more than 10 µm (per one porous layer) decreases resistance to lithium ion permeation in the nonaqueous electrolyte secondary battery and therefore makes it possible to reduce a decrease in a rate characteristic and cycle characteristic. Setting the thickness of the porous layer to be not more than 10 µm (per one porous layer) also reduces an increase in distance between the positive electrode and negative electrode, and therefore makes it possible to reduce a decrease in the internal volume efficiency of the nonaqueous electrolyte secondary battery.

The weight per unit area of the porous layer can be appropriately determined in view of the strength, film thickness, weight, and handleability of the porous layer. The weight per unit area of the porous layer is preferably 0.5 g/m$^2$ to 10.0 g/m$^2$, more preferably 0.5 g/m$^2$ to 8.0 g/m$^2$, and even more preferably 0.5 g/m$^2$ to 5.0 g/m$^2$ per one porous layer. A porous layer having a weight per unit area within the above numerical ranges allows a nonaqueous electrolyte secondary battery including the porous layer to have a higher weight energy density and a higher volume energy density. A porous layer whose weight per unit area exceeds the above ranges tends to cause a nonaqueous electrolyte secondary battery to be heavy.

The porous layer has a porosity of preferably 20% by volume to 90% by volume, and more preferably 30% by volume to 80% by volume, in order to achieve sufficient ion permeability. The pores in the porous layer have a diameter of preferably not more than 1.0 µm, and more preferably not more than 0.5 µm. In a case where the pores each have such a diameter, the porous layer can achieve sufficient ion permeability in a nonaqueous electrolyte secondary battery.

[2. Method of Producing Nonaqueous Electrolyte Secondary Battery Laminated Separator]

<Method of Producing Polyolefin Porous Film>

A method of producing the porous film is not particularly limited. For example, the polyolefin porous film can be produced by a method as follows. First, polyolefin-based resin is kneaded together with a pore forming agent such as an inorganic bulking agent or a plasticizer, and optionally with another agent(s) such as an antioxidant. After kneading, the kneaded substances are extruded so as to produce a polyolefin resin composition in sheet form. The pore forming agent is then removed from the polyolefin resin composition in sheet form with use of a suitable solvent. After the pore forming agent is removed, the polyolefin resin composition is stretched so that a polyolefin porous film is obtained.

The inorganic bulking agent is not particularly limited. Examples of the inorganic bulking agent encompass inorganic fillers; one specific example is calcium carbonate. The plasticizing agent is exemplified by, but not particularly limited to, a low molecular weight hydrocarbon such as liquid paraffin.

Examples of methods for producing the porous film encompass a method including the following steps.

(A) Obtaining a polyolefin resin composition by kneading ultra-high molecular weight polyethylene, low molecular weight polyethylene having a weight-average molecular weight of not more than 10,000, a pore forming agent such as calcium carbonate or a plasticizer, and an antioxidant;

(B) Forming a sheet by (i) rolling the polyolefin resin composition with use of a pair of reduction rollers and (ii) cooling the polyolefin resin composition in stages while tensioning the polyolefin resin composition with use of a take-up roller whose velocity ratio differs from that of the reduction rollers;

(C) Removing the pore forming agent from the sheet with use of a suitable solvent; and (D) Stretching the sheet, from which the pore forming agent has been removed, with use of a suitable stretch ratio.

<Method of Producing Porous Layer>

The porous layer can be formed with use of a coating solution which is obtained by (i) dissolving or dispersing resin in a solvent and (ii) dispersing a filler in the solvent. The solvent can be described as both a solvent in which the resin is dissolved and a dispersion medium in which the resin or filler is dispersed. Examples of a method for forming the coating solution encompass a mechanical stirring method, an ultrasonic dispersion method, a high-pressure dispersion method, and a media dispersion method.

The porous layer can be formed by, for example, the following methods: (i) applying the coating solution directly to a surface of a base material and then removing the solvent; (ii) applying the coating solution to a suitable support, subsequently removing the solvent so as to form a porous layer, pressure-bonding the porous layer to the base material, and peeling the support off; (iii) applying the coating solution to a surface of a suitable support, pressure-bonding the base material to a coating surface, peeling the support off, and then removing the solvent; or (iv) carrying out dip coating by immersing the base material into the coating solution, and then removing the solvent. A method of producing the nonaqueous electrolyte secondary battery laminated separator in accordance with an embodiment of the present invention can be a method in which the above-described polyolefin porous film is used as the base material which is coated with the coating solution.

The solvent preferably (i) does not have an adverse effect on the base material, (ii) allows the resin to be uniformly and stably dissolved in the solvent, and (iii) allows the filler to be uniformly and stably dispersed in the solvent. Examples of the solvent encompass N-methyl-2-pyrrolidone, N,N-dimethylacetamide, N,N-dimethylformamide, acetone, alcohols (such as isopropyl alcohol or ethanol), water, and a mixed solvent containing two or more of these examples.

As necessary, the coating solution may contain, as a component(s) other than the resin and the filler, for example, a dispersing agent, a plasticizer, a surfactant, and/or a pH adjusting agent.

The coating solution can be applied to the base material by a conventionally known method. Specific examples of such a method encompass a gravure coater method, a dip coater method, a bar coater method, and a die coater method.

The crack area ratio and the total length of the cracks can be controlled for example in the following manner. Specifically, one example method is to appropriately adjust e.g. the following in accordance with the composition of the coating solution: (i) the speed of drying of the surface of the coating film produced by coating the coating solution; (ii) a drying temperature used in a drying step in which the solvent is to be evaporated; (iii) wind speed; and (iv) speed at which the film is transferred. For example, rapidly drying the surface of the porous layer in an initial stage of drying in which the coated film (the porous film having been coated with the coating solution; i.e., a laminated film) is transferred at a transfer speed of 1.0 m/min to 1.2 m/min tends to makes it possible to control the crack area ratio to fall in a suitable range. A specific example for use in a case where a water-based solvent is used is a method in which drying of the surface of the coating film at 90° C. to 120° C. is carried out within 3 minutes after applying the coating solution. A specific example for use in a case where an NMP-based solvent is used is a method of drying the surface of the coating film 240° C. to 260° C. in an initial stage of drying.

[3. Nonaqueous Electrolyte Secondary Battery Member, Nonaqueous Electrolyte Secondary Battery]

A member for a nonaqueous electrolyte secondary battery (herein also referred to as a "nonaqueous electrolyte secondary battery member") in accordance with an embodiment of the present invention includes: a positive electrode; the above-described nonaqueous electrolyte secondary battery laminated separator; and a negative electrode, the positive electrode, the nonaqueous electrolyte secondary battery laminated separator, and the negative electrode being arranged in this order. A nonaqueous electrolyte secondary battery in accordance with an embodiment of the present invention includes the above-described nonaqueous electrolyte secondary battery laminated separator. The nonaqueous electrolyte secondary battery is not particularly limited in shape and can have any shape such as the shape of a thin plate (sheet), a disk, a cylinder, or a prism such as a cuboid.

The nonaqueous electrolyte secondary battery can be produced by a publicly known conventional method. As one example, first, a nonaqueous electrolyte secondary battery member is formed by providing a positive electrode, the laminated separator, and a negative electrode in this order. The porous layer can be provided between the polyolefin porous film and at least one of the positive electrode and the negative electrode. Next, the nonaqueous electrolyte secondary battery member is inserted into a container which serves as a housing for the nonaqueous electrolyte secondary battery. The container is then filled with nonaqueous electrolyte, and then hermetically sealed while pressure is reduced in the container. In this way, the nonaqueous electrolyte secondary battery can be produced.

<Positive Electrode>

The positive electrode employed in an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer, containing a positive electrode active material and a binding agent, is formed on a positive electrode current collector. The active material layer may further contain an electrically conductive agent.

Examples of the positive electrode active material encompass materials each capable of being doped with and dedoped of metal ions such as lithium ions or sodium ions. Specific examples of the materials encompass lithium complex oxides each containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use only one of these electrically conductive agents or two or more of these electrically conductive agents in combination.

Examples of the binding agent encompass: fluorine-based resins such as polyvinylidene fluoride (PVDF); acrylic resin; and styrene butadiene rubber. Note that the binding agent serves also as a thickener.

Examples of positive electrode current collector encompass electric conductors such as Al, Ni, and stainless steel. Of these electric conductors, Al is more preferable because Al is easily processed into a thin film and is inexpensive.

Examples of a method for producing the positive electrode sheet encompass: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

<Negative Electrode>

The negative electrode employed in an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer, containing a negative electrode active material and a binding agent, is formed on a negative electrode current collector. The active material layer may further contain an electrically conductive agent.

Examples of the negative electrode active material encompass materials each capable of being doped with and dedoped of metal ions such as lithium ions or sodium ions. Examples of the materials encompass carbonaceous materials. Examples of the carbonaceous materials encompass natural graphite, artificial graphite, cokes, carbon black, and pyrolytic carbons.

Examples of the negative electrode current collector encompass Cu, Ni, and stainless steel. Of these materials, Cu is more preferable because Cu is not easily alloyed with lithium and is easily processed into a thin film.

Examples of a method for producing the negative electrode sheet encompass: a method in which the negative electrode active material is pressure-molded on the negative electrode current collector; and a method in which (i) the negative electrode active material is formed into a paste with use of an appropriate organic solvent, (ii) the negative electrode current collector is coated with the paste, and (iii) the paste is dried and then pressure is applied so that the paste is firmly fixed to the negative electrode current collector. The paste preferably contains an electrically conductive agent as described above and a binding agent as described above.

<Nonaqueous Electrolyte>

A nonaqueous electrolyte for an embodiment of the present invention is not limited to any particular one, provided that the nonaqueous electrolyte is one that is generally used for a nonaqueous electrolyte secondary battery. The nonaqueous electrolyte can be, for example, a nonaqueous electrolyte containing an organic solvent and a lithium salt dissolved therein. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one of the above lithium salts or two or more of the above lithium salts in combination.

Examples of the organic solvent to be contained in the nonaqueous electrolyte encompass carbonates, ethers, esters, nitriles, amides, carbamates, sulfur-containing compounds, and fluorine-containing organic solvents each obtained by introducing a fluorine group into any of these organic solvents. It is possible to use only one of the above organic solvents or two or more of the above organic solvents in combination.

EXAMPLES

The present invention will be described below in more detail with reference to Examples and Comparative Examples. Note, however, that the present invention is not limited to such Examples.

[Measurement Methods]

Properties etc. of the laminated separators, porous films, and porous layers of the Examples and Comparative Examples were measured using the following methods. In the following descriptions, the porous film is referred to as "layer A", and the porous layer is referred to as "layer B".

(1) Thickness (Unit: μm)

The thickness of the laminated separator (i.e., the thickness of the entire laminated separator including the layer A and the layer B), the thickness of the layer A, and the thickness of the layer B were each measured with use of a high-resolution digital measuring device manufactured by Mitutoyo Corporation.

(2) Weight per Unit Area (Unit: g/m²)

A rectangular sample measuring 6.4 cm×4 cm was cut out from the laminated separator, and the weight W [g] of the sample was measured. The weight per unit area of the laminated separator was then calculated using the following formula.

Weight per unit area $[g/m^2] = W/(0.064 \times 0.04)$

The weight per unit area of the layer A was calculated in a similar manner. The weight per unit area of the layer B was calculated by subtracting the weight per unit area of the layer A from the weight per unit area of the laminated separator.

(3) Average Particle Diameter (D50), Particle Size Distribution (Unit: μm)

The particle diameter of the filler was measured with use of MICROTRAC (model: MT-3300EXII) available from Nikkiso Co., Ltd.

(4) SEM Observation of Surface of Layer B

A piece measuring 0.5 cm×0.5 cm was cut out from a sample of the laminated separator. The surface of this piece was coated with platinum via sputtering in a vacuum at 10 Pa. Next, a scanning electron microscope (SEM) was used to observe the surface of the layer B in a vacuum, using the following conditions.

(SEM Observation Conditions)

Measurement device: scanning electron microscope SU1510, manufactured by Hitachi High-Technologies Corporation Acceleration voltage: 10 kV Deceleration voltage: 0 kV Emission current: 60 μA Measurement distance: 25,500 μm Measurement magnification: 500×

Data size: 640×480

Pixel size: 396.875

Micron marker: 100,000

Photo size: 1,000

Scan speed: Slow 3

Condenser 1: 50,000

Calibration scan speed: 8

Color mode: Grayscale

In this way, an SEM image was obtained. When obtaining the SEM image, image quality was adjusted using e.g. autofocus and auto-contrast functions.

(5) Crack Area Ratio (Unit: percent), Total Length of Cracks (Unit: μm)

The SEM image obtained as in "(4) SEM Observation of Surface of Layer B" above was expanded to A4 size and then printed out. OHP film was laid upon the printed image, and a very fine tipped oil-based black ink marker was used to fill in areas where cracks were observed in the surface of the layer B. In this way, the cracks were reproduced as a projected image on the OHP film. This projected image was scanned with a scanner, to create a PDF thereof. The PDF file was opened in the free image analysis software ImageJ provided by the American National Institutes of Health (NIH), and binarization was carried out for the areas with cracks and areas with no cracks. Specifically, "Binary" and then "Make Binary" were selected from the "Process" tab. A "Threshold" window was opened by selecting "Adjust" and then "Threshold" from the "Image" tab. The "Set" button was clicked in the "Threshold" window to open a "Set Threshold Levels" window. After entering the threshold as 200-255, the "Apply" button was clicked, so that binarization was carried out. Thereafter, "Analyze Particle" was selected from the "Analyze" tab, to calculate an area.

The area of the cracks thus calculated was used in the following Formula (I) to determine the crack area ratio [%].

Crack area ratio [%]=sum of area of cracks [μm²]/ total area of SEM image [μm²]  (I)

This process, from obtaining the SEM image through the calculation of crack area ratio [%] using ImageJ, was carried out 5 times (n=5), and the five crack area ratios [%] were averaged.

The total length of cracks was found as the sum of the Feret's diameter (unit: μm) of each crack, using the item "Feret's Diameter" in ImageJ for the image binarized as above. This process, from obtaining the SEM image through the calculation of the total length of cracks using ImageJ, was carried out 5 times (n=5), and the five total lengths of cracks were averaged.

(6) Shape Retention Ratio Upon Heating

A square sample measuring 5 cm (machine direction; MD)×5 cm (transverse direction; TD) was cut out from the laminated separator. Onto that sample was drawn a square measuring 4 cm (MD)×4 cm (TD). The lengths of the two sides of the drawn square which were parallel to the MD were accurately measured (to a hundredth of a centimeter). The average of these two lengths was considered to be L1. Next, the sample was sandwiched between paper and then placed in an oven heated to 150° C. After 1 hour, the sample was removed from the oven, and once again the lengths of the two sides of the drawn square which were parallel to the MD were measured in the same manner as before. The average of these two lengths was considered to be L2. L1 and L2 were used in the following Formula (II) to calculate an MD-wise shape retention ratio upon heating.

$$\text{Shape retention ratio upon heating } (\%) = (L2/L1) \times 100 \quad \text{(II)}$$

(7) Resistance Immediately After Electrolyte Introduction

Used in this measurement was a nonaqueous electrolyte secondary battery including the laminated separator as produced in each of the Examples and Comparative Examples. The battery was subjected to measurement immediately after electrolyte was introduced therein, with no charging or discharging having taken place. At a room temperature of 25° C., a voltage amplitude of 10 mV was applied to the battery with use of an LCR meter (product name: chemical impedance meter; model no.: 3532-80; manufactured by Hioki E.E. Corporation), and a Nyquist plot was obtained. A real part of an X intercept of a measurement frequency of 10 kHz was read as the resistance value $R_{10\ Hz}$ (alternating current resistance value), and this was considered to be the 10 Hz resistance value. Here, $R_{10\ Hz}$ expresses the resistance of the entire battery.

Example 1

A laminated separator 1 was produced using the layer A and layer B described below.

<Layer A>

A porous film to serve as a base material was produced with use of polyethylene, which is a polyolefin.

Specifically, 70 parts by weight of an ultra-high molecular weight polyethylene powder (340M, manufactured by Mitsui Chemicals, Inc.) and 30 parts by weight of a polyethylene wax (FNP-0115, manufactured by Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate (manufactured by Maruo Calcium Co., Ltd.) having an average particle diameter of 0.1 μm was further added so that the calcium carbonate accounted for 38% by volume of the total volume. Then, the above composition in powder form was mixed with use of a Henschel mixer, and was then melt-kneaded by a twin screw kneading extruder. This produced a polyethylene resin composition. Next, the polyethylene resin composition was rolled with use of a pair of rollers each having a surface temperature of 150° C., so that a sheet was prepared. This sheet was immersed in an aqueous hydrochloric acid solution containing 4 mol/L of hydrochloric acid and 0.5% by weight of nonionic surfactant, to dissolve the calcium carbonate into the aqueous solution and remove the calcium carbonate from the sheet. Then, the sheet was stretched at 105° C. at a stretch ratio of 6 times, so that a polyethylene porous film was prepared, as the layer A.

<Layer B>

At room temperature, to a 2-L separable flask in which nitrogen substitution had been performed, 154.15 g of resorcin and 340.89 g of 37% aqueous formaldehyde solution were added so that a molar ratio between the resorcin and formaldehyde would be 1:3. Then, 1541.5 g of water and 0.0786 g of sodium carbonate were further added. The contents of the flask were brought up to 80° C. in temperature. The temperature was maintained at 80° C. for 24 hours, so that a polymerization reaction occurred. This produced a suspension containing particles of a resorcin-formalin resin (RF resin). The suspension was cooled and then centrifuged so that the particles of the RF resin precipitated. Then, a supernatant dispersion medium was removed, leaving the precipitated particles of the RF resin. Then, the RF resin was cleaned by carrying out, twice, a cleaning process involving: adding water which serves as a cleaning liquid to the precipitated RF resin particles; stirring the water and the RF resin particles; performing centrifuging; and removing the cleaning liquid. The particles of the RF resin thus cleaned were dried, so that an organic filler (1) (D50=1.0 μm) was synthesized in a specific quantity.

As a binder resin, sodium carboxymethyl cellulose (CMC) (CMC1110, manufactured by Daicel Corporation) was used. Used as a solvent was a mixed solvent, obtained by mixing water (95 weight %) and isopropyl alcohol (5 weight %).

The organic filler (1), the CMC, and the above solvent were mixed at a ratio so that a solid content concentration would be 20.0 weight %, and so that a weight ratio of the organic filler (1) to the CMC would be 100:3. This produced a dispersion liquid of the organic filler (1). Then, the dispersion liquid thus obtained was dispersed by high pressure (high-pressure dispersion conditions: 100 MPa×3 passes) with use of a high-pressure dispersion device (Star Burst, manufactured by Sugino Machine Limited), so that a coating solution 1 was prepared.

<Laminated Separator>

One surface of the layer A was subjected to a corona treatment at 20 W/(m²/min). Then, the surface of the layer A, which surface had been subjected to the corona treatment, was coated with the coating solution 1 with use of a gravure coater. Within 1 minute after applying the coating solution 1 uniformly on the layer A, rapid drying of the coating surface at an initial drying temperature of 120° C. was carried out while transferring the coated film at a transfer speed of 1.2 m/min, so as to form the layer B. Note that the drying temperature used in the drying step in which the solvent was evaporated, the wind speed, and the speed at which the film was transferred were suitably adjusted in accordance with the composition of the coating solution. In this way, a laminated separator 1 was obtained in which the layer B having cracks in its surface was disposed on one surface of the layer A.

Example 2

A laminated separator 2 was produced using the layer A and layer B described below.

<Layer A>

A polyethylene porous film was prepared as the layer A in the same manner as in Example 1.

<Layer B>

At room temperature, to a 2-L separable flask in which nitrogen substitution had been performed, 154.15 g of resorcin and 170.45 g of 37% aqueous formaldehyde solution were added so that a molar ratio between the resorcin and formaldehyde would be 1:1.5. Then, 1541.5 g of water and 0.0786 g of sodium carbonate were further added. The contents of the flask were brought up to 80° C. in temperature. The temperature was maintained at 80° C. for 24 hours, so that a polymerization reaction occurred. This produced a suspension containing particles of an RF resin. The suspension was cooled and then centrifuged so that the particles of the RF resin precipitated. Then, a supernatant dispersion medium was removed, leaving the precipitated particles of the RF resin. Then, the RF resin was cleaned by carrying out, twice, a cleaning process involving: adding water which serves as a cleaning liquid to the precipitated RF resin particles; stirring the water and the RF resin particles; performing centrifuging; and removing the cleaning liquid. The particles of the RF resin thus cleaned were dried, so that an organic filler (2) (D50=1.0 μm) was synthesized in a specific quantity.

The organic filler (2), the CMC, and the solvent used in Example 1 were mixed at a ratio so that a solid content concentration would be 20.0 weight %, and so that a weight ratio of the organic filler (2) to the CMC would be 100:8. This produced a dispersion liquid of the organic filler (2). Then, the dispersion liquid thus obtained was dispersed by high pressure (high-pressure dispersion conditions: 100 MPa×3 passes) with use of a high-pressure dispersion device (Star Burst, manufactured by Sugino Machine Limited), so that a coating solution 2 was prepared.

<Laminated Separator>

A laminated separator 2 in which the layer B was disposed on one surface of the layer A was obtained in a manner similar to Example 1, except that the coating solution 2 was used instead of the coating solution 1.

Example 3

A laminated separator 3 was produced using the layer A and layer B described below.

<Layer A>

A polyethylene porous film was prepared as the layer A in the same manner as in Example 1.

<Layer B>

A coating solution 3 was prepared in a manner similar to Example 1, except that a combined filler (1) was used instead of the organic filler (1). The combined filler (1) consisted of the organic filler (2) prepared in Example 2 and an α alumina powder (D50=0.46 μm, Sumicorundum AA05, manufactured by Sumitomo Chemical Co., Ltd.) at a weight ratio of 41:59 (organic filler (2):α alumina powder).

<Laminated Separator>

A laminated separator 3 in which the layer B was disposed on one surface of the layer A was obtained in a manner similar to Example 1, except that the coating solution 3 was used instead of the coating solution 1.

Example 4

A laminated separator 4 was produced using the layer A and layer B described below.

<Layer A>

A polyethylene porous film was prepared as the layer A in the same manner as in Example 1.

<Layer B>

A coating solution 4 was prepared in a manner similar to Example 1, except that the binder resin used was changed from CMC to a commercially available acrylic ester resin emulsion.

<Laminated Separator>

A laminated separator 4 in which the layer B was disposed on one surface of the layer A was obtained in a manner similar to Example 1, except that the coating solution 4 was used instead of the coating solution 1.

Example 5

A laminated separator 5 was produced using the layer A and layer B described below.

<Layer A>

A polyethylene porous film was prepared as the layer A in the same manner as in Example 1.

<Layer B>

Aluminiumoxid/Titandioxid ($Al_2O_3$:$TiO_2$=60:40, solid solution), manufactured by Ceram GmbH, was used as a metal oxide. The metal oxide was ground for 4 hours in a vibrating mill, provided with an alumina pot having a capacity of 3.3 L and alumina balls having a diameter φ of 15 mm, to obtain fine metal oxide particles.

(Production of Coating Solution)

The fine metal oxide particles, a vinylidene fluoride-hexafluoropropylene copolymer (product name "KYNAR2801", manufactured by Arkema Inc.) serving as a binder resin, and N-methyl-2-pyrrolidinone (manufactured by Kanto Chemical Co., Inc.) serving as a solvent were mixed together as follows.

First, 10 parts by weight of the vinylidene fluoride-hexafluoropropylene copolymer was added to 90 parts by weight of the fine metal oxide particles to obtain a mixture. The solvent was added to the mixture thus obtained so that the combined solid content of the fine metal oxide particles and the vinylidene fluoride-hexafluoropropylene copolymer had a concentration of 40% by weight. A mixed solution was thus obtained. The mixed solution thus obtained was stirred and mixed in a thin-film rotary high-speed mixer (FILMIX (registered trademark), manufactured by PRIMIX Corporation) to obtain a uniform coating solution 5.

<Laminated Separator>

A laminated separator 5 in which the layer B was disposed on one surface of the layer A was obtained in a manner similar to Example 1, except that (i) the coating solution 5 was used instead of the coating solution 1, and (ii) within 1 minute after applying the coating solution 5 uniformly on the layer A, rapid drying of the coating surface was carried out at an initial drying temperature of 250° C. while transferring the coated film at a transfer speed of 1.2 m/min.

Comparative Example 1

A laminated separator 6 was produced using the layer A and layer B described below.

<Layer A>

A polyethylene porous film was prepared as the layer A in the same manner as in Example 1.

<Layer B>

A coating solution 6 was produced in a manner similar to Example 1, except that an α alumina powder (Sumicorundum AA05, manufactured by Sumitomo Chemical Co., Ltd.) was used instead of the organic filler (1).

<Laminated Separator>

One surface of the layer A was subjected to a corona treatment at 20 W/(m²/min). Then, the surface of the layer A, which surface had been subjected to the corona treatment, was coated with the coating solution 6 with use of a gravure coater. After the coating solution 6 was uniformly coated onto the layer A, the resultant coating film was dried as 60° C. to form the layer B. This produced a laminated separator 6 in which the layer B was disposed on the one surface of the layer A.

Comparative Example 2

A laminated separator 7 was produced using the layer A and layer B described below.

<Layer A>

A polyethylene porous film was prepared as the layer A in the same manner as in Example 1.

<Layer B>

A coating solution 7 was prepared in a manner similar to Example 1, except that a combined filler (2) was used instead of the organic filler (1). The combined filler (2) consisted of the organic filler (2) prepared in Example 2 and an α alumina powder (Sumicorundum AA05, manufactured by Sumitomo Chemical Co., Ltd.) at a weight ratio of 10:90 (organic filler (2):α alumina powder).

<Laminated Separator>

A laminated separator 7 in which the layer B was disposed on one surface of the layer A was obtained in a manner similar to Comparative Example 1, except that the coating solution 7 was used instead of the coating solution 6.

[Preparation of Nonaqueous Electrolyte Secondary Battery]

<Preparation of Positive Electrode>

First, 6 parts by weight of acetylene black and 4 parts by weight of polyvinylidene fluoride (manufactured by Kureha Corporation) were added to 90 parts by weight of $LiNi_{1/3}Mn_{1/3}Co_{1/3}O_2$ serving a positive electrode active material. These substances were mixed to obtain a mixture. The mixture was dispersed in N-methyl-2-pyrolidone to obtain a slurry. The slurry was uniformly applied to a part of an aluminum foil serving as a positive electrode current collector and dried, to obtain a positive electrode active material layer. The positive electrode active material layer was then rolled by rollers of a pressing machine so as to have a thickness of 80 μm. The aluminum foil thus rolled was cut so that the positive electrode active material layer was present in an area of 40 mm×35 mm and that area was surrounded by an area measuring 13 mm in width in which no positive electrode active material layer was present. The piece thus cut was used as a positive electrode. The positive electrode active material layer had a density of 2.50 g/cm³.

<Preparation of Negative Electrode>

To 98 parts by weight of graphite powder serving as a negative electrode active material, the following were added: 100 parts by weight of an aqueous solution of carboxymethyl cellulose (carboxymethyl cellulose concentration: 1 weight %) serving as a thickener and binding agent; and 1 part by weight of a water-based emulsion of styrene-butadiene rubber. These substances were mixed to obtain a slurry. The slurry was applied to a part of a copper foil (thickness of copper foil: 20 μm) serving as a negative electrode current collector and dried, to obtain a negative electrode active material layer. The negative electrode active material layer was then rolled by rollers of a pressing machine so as to have a thickness of 80 μm. The copper foil thus rolled was cut so that a negative electrode active material layer was present in an area of 50 mm×40 mm and that area was surrounded by an area measuring 13 mm in width in which no negative electrode active material layer was present. The piece thus cut was used as a negative electrode. The negative electrode active material layer had a density of 1.40 g/cm³.

<Preparation of Nonaqueous Electrolyte Secondary Battery>

Nonaqueous electrolyte secondary batteries were prepared using each of the laminated separators 1 through 7 as follows. First, the positive electrode, the laminated separator, and the negative electrode were disposed in this order in a laminate pouch to obtain a nonaqueous electrolyte secondary battery member. During this operation, the positive electrode, the laminated separator, and the negative electrode were arranged such that (i) the layer B of the laminated separator was in contact with the positive electrode active material layer of the positive electrode, and (ii) the layer A of the laminated separator was in contact with the negative electrode active material layer of the negative electrode. The positive electrode and the negative electrode were also arranged such that a main surface of the positive electrode active material layer of the positive electrode was entirely within the bounds of a main surface of the negative electrode active material layer of the negative electrode (i.e., entirely covered by the main surface of the negative electrode active material layer of the negative electrode).

Subsequently, the nonaqueous electrolyte secondary battery member was put into a bag made of an aluminum layer and a heat seal layer laminated together. Then, 0.23 mL of a nonaqueous electrolyte was introduced into the bag. The above nonaqueous electrolyte had been produced by dissolving $LiPF_6$ into a mixed solvent (obtained by mixing ethylene carbonate, ethyl methyl carbonate, and diethyl carbonate at a volume ratio of 3:5:2), so that the $LiPF_6$ would be contained at a concentration of 1 mol/L. The bag was then heat-sealed while the pressure inside the bag was reduced, so that a nonaqueous electrolyte secondary battery was obtained.

[Measurement Results]

Figure 2:
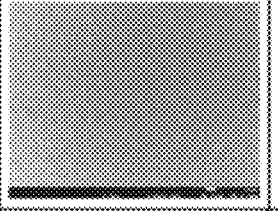
FIG. 2 consists of (i) SEM images of the surfaces of porous layers included in the nonaqueous electrolyte secondary battery laminated separators of Comparative Examples 1 and 2, and (ii) a binarized image.

FIG. 1 consists of SEM images and binarized images of the surfaces of the layers B included in the laminated separators 1 through 5 obtained in Examples 1 to 5. FIG. 2 consists of (i) SEM images of the surfaces of the layers B included in the laminated separators 6 and 7 obtained in Comparative Examples 1 and 2, and (ii) a binarized image. Note that no binarized image is provided for Comparative Example 1, because no cracks were observed in Comparative Example 1.

Tables 1 and 2 indicate e.g. the properties of these laminated separators and the properties of nonaqueous electrolyte secondary batteries including these laminated separators, as measured via the above-described methods. In the column titled "Filler" in Table 1, the ratio in parentheses is the molar ratio of resorcin to formaldehyde.

TABLE 1

| Laminated separator | Filler | Binder | Filler:binder (weight ratio) | Thickness of entire laminated separator (μm) | Thickness of layer B (μm) | Weight per unit area of layer B (g/m$^2$) |
|---|---|---|---|---|---|---|
| Example 1 | 1 | RF (1:3) | CMC | 100:3 | 15.6 | 3.6 | 2.5 |
| Example 2 | 2 | RF (1:1.5) | CMC | 100:8 | 17.1 | 5.0 | 3.5 |
| Example 3 | 3 | RF (1:1.5):AA05 = 41:59 | CMC | 100:3 | 19.4 | 7.3 | 4.0 |
| Example 4 | 4 | RF (1:3) | Acrylic ester resin emulsion | 86:14 | 18.6 | 6.6 | 4.2 |
| Example 5 | 5 | Al$_2$O$_3$/TiO$_2$ = 60:40 | PVDF | 90:10 | 18.0 | 5.5 | 6.5 |
| Comparative Example 1 | 6 | AA05 | CMC | 100:3 | 15.6 | 3.6 | 3.8 |
| Comparative Example 2 | 7 | RF (1:1.5):AA05 = 10:90 | CMC | 100:3 | 14.8 | 2.8 | 2.5 |

TABLE 2

| | Laminated separator | Crack area ratio (%) | Total length of cracks (μm) | Shape retention ratio upon heating at 150° C. (1 hr) | 10 Hz resistance** (Ω) |
|---|---|---|---|---|---|
| Example 1 | 1 | 2.1 | 348.6 | 90.0 | 0.86 |
| Example 2 | 2 | 7.9 | 1580.1 | 88.8 | 1.28 |
| Example 3 | 3 | 1.8 | 511.0 | 92.5 | 1.07 |
| Example 4 | 4 | 0.3 | 139.4 | 60.0 | 1.02 |
| Example 5 | 5 | 2.9 | 577.9 | 52.5 | 0.86 |
| Comparative Example 1 | 6 | 0.0 | 0.0 | 35.1 | 1.40 |
| Comparative Example 2 | 7 | 0.1 | 32.1 | 37.5 | 1.57 |

**10 Hz resistance in nonaqueous electrolyte secondary battery immediately after introduction of electrolyte As seen in Table 2, it was confirmed that nonaqueous electrolyte secondary batteries using the laminated separators of Examples 1 to 5, in which the surface crack area ratio was 0.2% to 10%, had a lower 10 Hz resistance after introduction of electrolyte than did batteries using the laminated separators of Comparative Examples 1 and 2. In other words, it was found that the laminated separators of Examples 1 to 5 exhibit an excellent initial battery characteristic when used in a nonaqueous electrolyte secondary battery. It was also confirmed that the laminated separators of Examples 1 to 5 have a higher shape retention ratio than the laminated separators of Comparative Examples 1 and 2. In other words, it was found that the laminated separators of Examples 1 to 5 have excellent heat resistance. Thus, it was found that controlling the crack area ratio of the surface of a porous layer to fall in a predetermined range makes it possible to obtain a laminated separator having excellent heat resistance and exhibit an excellent initial battery characteristic when used in a nonaqueous electrolyte secondary battery.

INDUSTRIAL APPLICABILITY

An aspect of the present invention can be used in production of a nonaqueous electrolyte secondary battery laminated separator that has excellent heat resistance and exhibits an excellent initial battery characteristic when used in a nonaqueous electrolyte secondary battery.

The invention claimed is:

1. A nonaqueous electrolyte secondary battery laminated separator comprising:
    a polyolefin porous film; and
    a porous layer which (i) is disposed on at least one surface of the polyolefin porous film and (ii) includes a binder resin and a heat resistant filler,
    the porous layer having a surface which has cracks,
    a ratio of a total area of the cracks to a surface area of the porous layer being 0.15% to 10%,
    the crack having a width of 0.5 to 5 μm, and
    an amount of the heat resistant filler with respect to a total amount of the binder resin and the heat resistant filler in the porous layer is not less than 40 weight % and not more than 90 weight %.

2. The nonaqueous electrolyte secondary battery laminated separator according to claim 1, wherein the heat resistant filler includes at least one selected from the group consisting of an organic filler and an inorganic filler.

3. The nonaqueous electrolyte secondary battery laminated separator according to claim 2, wherein the organic filler includes a thermoplastic resin having heat resistance or a thermosetting resin.

4. The nonaqueous electrolyte secondary battery laminated separator according to claim 2, wherein the inorganic filler includes at least one compound selected from the group consisting of alumina, boehmite, aluminum hydroxide, magnesium hydroxide, magnesium oxide, titanium oxide, and silica.

5. The nonaqueous electrolyte secondary battery laminated separator according to claim 1, wherein binder resin is selected from the group consisting of a polyolefin, a (meth)acrylate resin, a fluorine-containing resin, a polyamide resin, a polyester resin, and a water-soluble polymer.

6. The nonaqueous electrolyte secondary battery laminated separator according to claim 5, wherein the polyamide resin is an aramid resin.

7. A nonaqueous electrolyte secondary battery member comprising:
    a positive electrode;
    the nonaqueous electrolyte secondary battery laminated separator according to claim 1; and
    a negative electrode,
    the positive electrode, the nonaqueous electrolyte secondary battery laminated separator, and the negative electrode being arranged in this order.

8. A nonaqueous electrolyte secondary battery comprising:
   the nonaqueous electrolyte secondary battery laminated separator according to claim 1.

9. A nonaqueous electrolyte secondary battery laminated separator comprising:
   a polyolefin porous film; and
   a porous layer which (i) is disposed on at least one surface of the polyolefin porous film and (ii) includes a binder resin and a heat resistant filler,
   the porous layer having a surface which has cracks,
   a ratio of a total area of the cracks to a surface area of the porous layer being 0.15% to 10%,
   wherein within a 230 μm×170 μm area of the surface of the porous layer, a total length of the cracks is 40.0 μm to 2000.0 μm.

* * * * *